United States Patent
Ehara et al.

(10) Patent No.: US 12,397,672 B2
(45) Date of Patent: Aug. 26, 2025

(54) POWER MANAGEMENT SYSTEM, VEHICLE, AND MANAGEMENT SERVER

(71) Applicant: TOYOTA JIDOSHA KABUSHIKI KAISHA, Toyota (JP)

(72) Inventors: Masato Ehara, Gotemba (JP); Daiki Yokoyama, Gotemba (JP); Yuki Takahashi, Susono (JP); Tomoya Takahashi, Ebina (JP); Tomoyuki Kubota, Susono (JP); Sachio Toyora, Gotemba (JP); Keisuke Fukuoka, Fujieda (JP); Zidan Xu, Yokohama (JP); Wenfeng Liang, Yokohama (JP); Hiroki Murata, Gotemba (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 553 days.

(21) Appl. No.: 18/053,783

(22) Filed: Nov. 9, 2022

(65) Prior Publication Data
US 2023/0219448 A1     Jul. 13, 2023

(30) Foreign Application Priority Data
Jan. 11, 2022  (JP) .............................. 2022-002073

(51) Int. Cl.
*B60L 53/66* (2019.01)
*B60L 53/12* (2019.01)
*B60L 53/68* (2019.01)

(52) U.S. Cl.
CPC .......... *B60L 53/665* (2019.02); *B60L 53/12* (2019.02); *B60L 53/68* (2019.02); *B60L 2240/70* (2013.01)

(58) Field of Classification Search
CPC ..................................................... B60L 53/665
USPC ......................................................... 320/109
See application file for complete search history.

(56) References Cited

U.S. PATENT DOCUMENTS

| | | | |
|---|---|---|---|
| 2003/0045969 A1* | 3/2003 | Matsuo .................. | G06Q 50/06 700/297 |
| 2022/0291648 A1* | 9/2022 | Sekino ................... | G05B 15/02 |
| 2025/0200524 A1* | 6/2025 | Choi ....................... | G06Q 10/04 |

FOREIGN PATENT DOCUMENTS

JP        2015-095983 A     5/2015

* cited by examiner

*Primary Examiner* — Jerry D Robbins
(74) *Attorney, Agent, or Firm* — Finnegan, Henderson, Farabow, Garrett and Dunner, LLP

(57) ABSTRACT

A power management system includes a vehicle and a charging or discharging lane. The charging or discharging lane configured to execute at least one of charging or discharging of the vehicle in a non-contact manner. The vehicle is configured to acquire contract contents including a charging or discharging amount and a charging or discharging period. The vehicle is configured to execute the contract contents in a charging or discharging lane that is different from electric vehicle supply equipment set in the contract contents and is reachable before the charging or discharging period when the vehicle is predicted to, before a start of the charging or discharging period, be unable to execute the contract contents in the set electric vehicle supply equipment.

12 Claims, 10 Drawing Sheets

FIG. 4

VEHICLE DB

| VEHICLE ID | POSITION OF VEHICLE | CONTRACT CONTENTS | | | PRESENCE/ ABSENCE OF CONTRACT VIOLATION |
|---|---|---|---|---|---|
| | | PROVISIONAL EVSE ID | CHARGING AMOUNT | CHARGING PERIOD | |
| C1 | P1 | E1 | M1 | K1 | ABSENT |
| C2 | P2 | E2 | M2 | K2 | PRESENT |
| C3 | P3 | E3 | M3 | K3 | - |
| ⋮ | ⋮ | ⋮ | ⋮ | ⋮ | ⋮ |

FIG. 5

CHARGING/DISCHARGING LANE DB

| CHARGING/ DISCHARGING LANE ID | RANGE OF CHARGING/ DISCHARGING LANE |
|---|---|
| L1 | Q1 |
| L2 | Q2 |
| L3 | Q3 |
| ⋮ | ⋮ |

POWER MANAGEMENT SYSTEM, VEHICLE, AND MANAGEMENT SERVER

CROSS-REFERENCE TO RELATED APPLICATION

This application claims priority to Japanese Patent Application No. 2022-002073 filed on Jan. 11, 2022, incorporated herein by reference in its entirety.

BACKGROUND

1. Technical Field

The present disclosure relates to a power management system, a vehicle, and a management server.

2. Description of Related Art

A management apparatus that manages charging and discharging of a vehicle traveling on electricity has been proposed. Hereinafter, the charging of the vehicle and the discharging of the vehicle are collectively referred to as "charging/discharging". The charging/discharging management apparatus is implemented by a home energy management system (HEMS) introduced to homes. For example, Japanese Unexamined Patent Application Publication No. 2015-95983 proposes a technique for executing non-contact charging and non-contact discharging of a battery electric vehicle by charging/discharging equipment in the HEMS.

SUMMARY

For example, in a field of a virtual power plant (VPP), a user of a vehicle may conclude a contract on the charging/discharging. The contents of the contract include, for example, a vehicle ID or a user ID of the vehicle to be charged/discharged, a start time of the charging/discharging, and position information of electric vehicle supply equipment in which the vehicle is charged/discharged.

When the contracted vehicle does not start the charging/discharging at the start time included in the contents of the contract, a penalty (for example, a fine) for violating the contents of the contract is imposed on the user of the vehicle by a management server or the like. Therefore, the user of the contracted vehicle causes the vehicle to travel such that it reaches the electric vehicle supply equipment by the start time. However, there is a case where the vehicle cannot be charged/discharged in the electric vehicle supply equipment. This case may be, for example, a case where the vehicle is not in the electric vehicle supply equipment by the start time due to sudden road congestion or the like.

As such, when the vehicle cannot be charged/discharged in the electric vehicle supply equipment, a penalty is imposed on the user of the vehicle, which is harsh for the user.

The present disclosure provides a technique for restricting a penalty from being imposed on a user due to non-execution of contract contents.

A power management system according to a first aspect of the present disclosure includes a vehicle, and a charging or discharging lane configured to execute at least one of charging or discharging of the vehicle in a non-contact manner. The vehicle is configured to acquire contract contents including a charging or discharging amount that defines at least one of a charging amount or a discharging amount, and a charging or discharging period that defines at least one of a charging period or a discharging period, and execute the contract contents in a charging or discharging lane that is different from electric vehicle supply equipment set in the contract contents and is reachable before the charging or discharging period when the vehicle is predicted to, before a start of the charging or discharging period, be unable to execute the contract contents in the set electric vehicle supply equipment.

With such a configuration, when it is predicted to be unable to execute the contract contents in the electric vehicle supply equipment set in the contract contents, by executing the contract contents in a charging or discharging lane, which is different from the set electric vehicle supply equipment and is reachable before the charging or discharging period, it is possible to restrict the penalty for violating the contract contents from being imposed on a user.

In the above aspect, the power management system may be configured to guide, when the vehicle is predicted to, before the start of the charging or discharging period, be unable to execute the contract contents in the set electric vehicle supply equipment, a user of the vehicle to travel in the charging or discharging lane.

With such a configuration, the user of the vehicle is guided to travel in the charging or discharging lane, and thus it is possible to easily execute the contract contents.

In the above aspect, the power management system may further include a server configured to communicate with the vehicle. When the contract contents are executed in the charging or discharging lane which is reachable before the charging or discharging period, the server may configured to receive execution completion information indicating that the contract contents have been executed.

With such a configuration, it is possible to cause the server to recognize that the contract contents have been executed in the charging or discharging lane.

In the above aspect, the vehicle may configured to send the execution completion information to the server.

With such a configuration, the vehicle sends the execution completion information to the server without a need for the charging or discharging lane to send the execution completion information to the server. Therefore, a communication function between the server and the charging or discharging lane is not needed, and thus it is possible to simplify a configuration of the power management system.

In the above aspect, the server may be configured to send, when the vehicle is predicted to, before the start of the charging or discharging period, be unable to execute the contract contents in the set electric vehicle supply equipment and be unable to reach the charging or discharging lane in which the contract contents are executable before the charging or discharging period, a request signal for requesting a substitute vehicle chargeable or dischargeable in the charging or discharging lane to execute the charging or the discharging based on the contract contents of the vehicle.

With such a configuration, when the vehicle is predicted to be unable to execute the contract contents in the electric vehicle supply equipment and be unable to reach the charging or discharging lane in which the contract contents are executable before the charging or discharging period, the charging or the discharging can be requested to the substitute vehicle, and thus it is possible to restrict the penalty for violating the contract contents from being imposed on the user.

In the above aspect, upon receiving the request signal from the server, the substitute vehicle may be configured to send, to the server, a response signal indicating whether to execute the charging or the discharging based on the contract contents of the vehicle.

In the above aspect, upon receiving the response signal indicating that the charging or the discharging is executed based on the contract contents of the vehicle, the server may be configured to send, to the vehicle, vehicle information indicating the substitute vehicle that has sent the response signal. Further, upon receiving the vehicle information, the vehicle may be configured to give the user of the vehicle a notification indicating that the substitute vehicle executes the charging or the discharging based on the contract contents of the vehicle.

With such a configuration, it is possible for the vehicle to cause the user to recognize that the substitute vehicle executes the charging or the discharging based on the contract contents of the vehicle, thereby reassuring the user.

In the above aspect, upon receiving the response signal indicating that the charging or the discharging is executed based on the contract contents of the vehicle, the server may be configured to send, to the substitute vehicle, a request signal for requesting that the charging or the discharging be executed based on the contract contents of the vehicle.

With such a configuration, it is possible for the server to cause the substitute vehicle to substitute for the vehicle and execute the charging or the discharging.

In the above aspect, upon receiving the request signal from the server, the substitute vehicle may be configured to guide a user of the substitute vehicle to travel in the charging or discharging lane in which the charging or the discharging requested in the request signal is executed.

With such a configuration, it is possible to cause the substitute vehicle to travel in the charging or discharging lane to substitute for the vehicle and execute the charging or the discharging of the vehicle.

In the above aspect, the contract contents may define the charging or discharging amount and the charging or discharging period, but do not have to define the electric vehicle supply equipment in which the charging or the discharging is executed.

With such a configuration, due to the contract contents that define the charging or discharging amount and the charging or discharging period but do not define the electric vehicle supply equipment in which the charging or the discharging is executed, it is possible to restrict the penalty for violating the contract contents from being imposed on the user.

A vehicle according to a second aspect of the present disclosure includes a processor, and a power device in which charging or discharging is executed by a charging or discharging lane configured to execute at least one of the charging or the discharging of the vehicle in a non-contact manner. The processor is configured to acquire contract contents including a charging or discharging amount that defines at least one of a charging amount or a discharging amount, and a charging or discharging period that defines at least one of a charging period or a discharging period, and execute the contract contents in a charging or discharging lane that is different from electric vehicle supply equipment set in the contract contents and is reachable before the charging or discharging period when the vehicle is predicted to, before a start of the charging or discharging period, be unable to execute the contract contents in the set electric vehicle supply equipment.

With such a configuration, due to the contract contents that define the charging or discharging amount and the charging or discharging period but do not define the electric vehicle supply equipment in which the charging or the discharging is executed, it is possible to restrict the penalty for violating the contract contents from being imposed on the user.

A server according to a third aspect of the present disclosure includes a communication interface configured to communicate with a vehicle, and a processor. The vehicle includes a power device in which charging or discharging is executed by a charging or discharging lane configured to execute at least one of the charging or the discharging of the vehicle in a non-contact manner, and is configured to acquire contract contents including a charging or discharging amount that defines at least one of a charging amount or a discharging amount, and a charging or discharging period that defines at least one of a charging period or a discharging period, and execute the contract contents in a charging or discharging lane that is different from electric vehicle supply equipment set in the contract contents and is reachable before the charging or discharging period when the vehicle is predicted to, before a start of the charging or discharging period, be unable to execute the contract contents in the set electric vehicle supply equipment. When the vehicle executes the contract contents in the charging or discharging lane, the processor is configured to receive execution completion information indicating that the contract contents have been executed.

With such a configuration, when it is predicted to be unable to execute the contract contents in the electric vehicle supply equipment set in the contract contents, by executing the contract contents in a charging or discharging lane, which is different from the set electric vehicle supply equipment and is reachable before the charging or discharging period, it is possible to restrict the penalty for violating the contract contents from being imposed on the user.

With each aspect of the present disclosure, it is possible to restrict a penalty for violating contract contents from being imposed on a user.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 4 is a diagram illustrating an example of a vehicle DB;

FIG. 5 is a diagram illustrating an example of a charging/discharging lane DB:

DETAILED DESCRIPTION OF EMBODIMENTS

Figure 1:
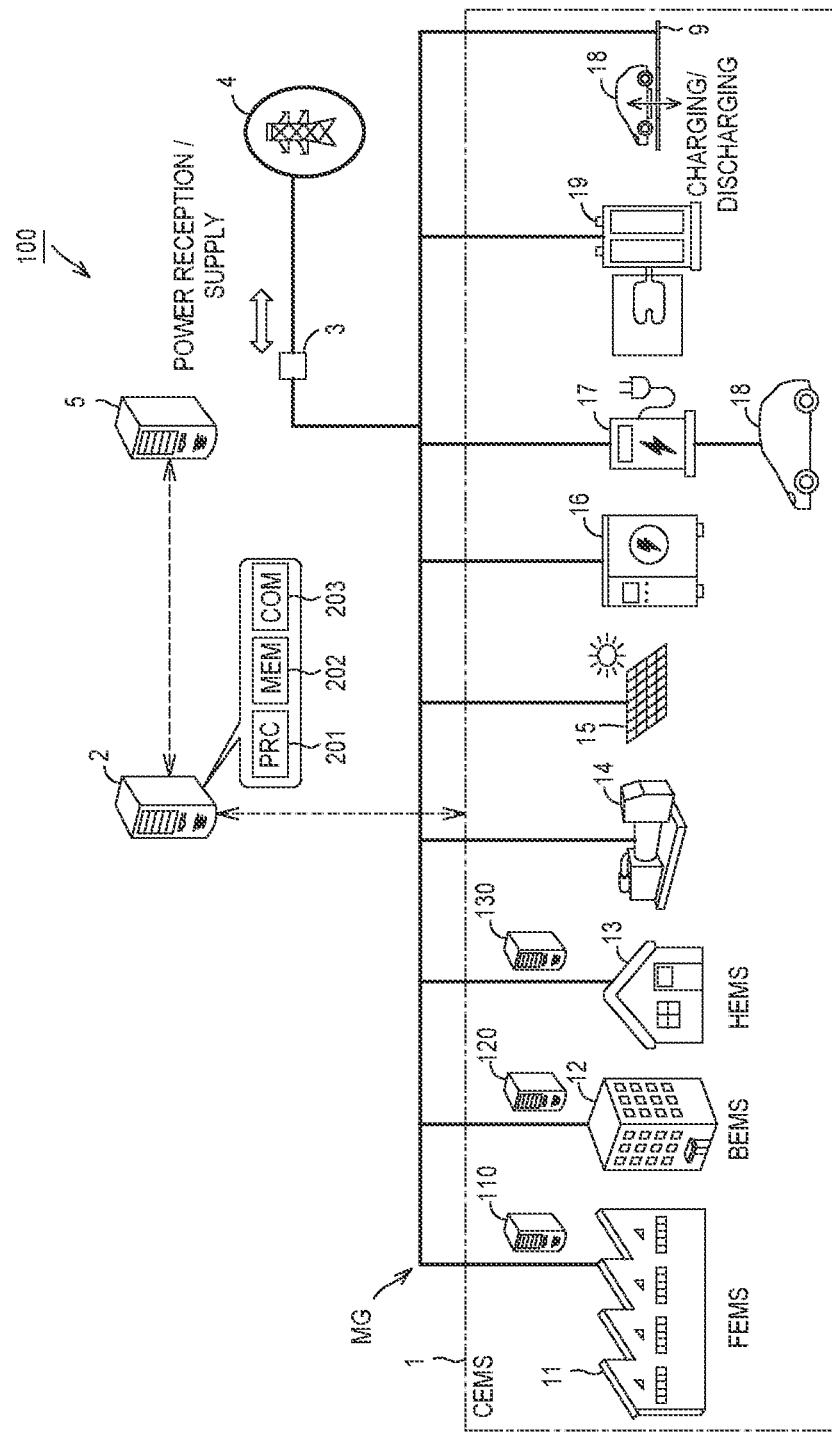
FIG. 1 is a diagram illustrating a schematic configuration of a power management system according to the present embodiment.

Hereinafter, embodiments of the present disclosure will be described in detail with reference to drawings. The same or corresponding parts in the drawings are denoted by the same reference signs, and the description thereof will not be repeated.

Configuration of Entire Power Management System

FIG. 1 is a diagram illustrating a schematic configuration of a power management system 100 according to the present embodiment. The power management system 100 typically corresponds to a virtual power plant (VPP). The power management system 100 includes a CEMS 1, a CEMS server 2, power reception/conversion equipment 3, a power system 4, and a power transmission/distribution company server 5. CEMS means a community energy management system or a city energy management system.

The CEMS 1 includes a factory energy management system (FEMS) 11, a building energy management system (BEMS) 12, a home energy management system (HEMS) 13, a generator 14, a naturally fluctuating power source 15, an energy storage system (ESS) 16, electric vehicle supply equipment (EVSE) 17, a vehicle 18, a heat accumulation system 19, and a charging/discharging lane 9. In the CEMS 1, a microgrid MG is constructed by the above components (components including the charging/discharging lane 9 and the like).

The FEMS 11 manages supply and demand of power used in a factory. The FEMS 11 includes a factory building (including air conditioning equipment and a lighting device), industrial equipment (for example, a production line), and the like, operated by power supplied from the microgrid MG. Although not shown, the FEMS 11 can include power generation equipment (for example, a generator and a solar panel) installed in the factory. Power generated by the above power generation equipment may be supplied to the microgrid MG. Further, the FEMS 11 may include power generation equipment (for example, a solar panel) or a cooling/heating source system (for example, a waste heat recovery system and a heat storage system). The FEMS 11 further includes a FEMS server 110 capable of bidirectionally communicating with the CEMS server 2.

The BEMS 12 manages supply and demand of power used in a building, such as an office or a commercial facility. The BEMS 12 includes air conditioning equipment and a lighting device installed in the building. The BEMS 12 may include power generation equipment and/or a cooling/heating source system. The BEMS 12 further includes a BEMS server 120 capable of bidirectionally communicating with the CEMS server 2.

The HEMS 13 manages supply and demand of power used in a home. The HEMS 13 includes a home appliance (for example, air conditioning equipment, a lighting device, and other electric appliances) operated by power supplied from the microgrid MG. Further, the HEMS 13 may include, for example, a solar panel, a home heat pump system, a home co-generation system, and a power accumulation battery for homes. The HEMS 13 further includes a HEMS server 130 capable of bidirectionally communicating with the CEMS server 2.

The generator 14 is power generation equipment that does not depend on weather conditions, and outputs generated power to the microgrid MG. Examples of the generator 14 include a steam turbine generator, a gas turbine generator, a diesel engine generator, a gas engine generator, a biomass generator, and a stationary fuel cell. An example of the generator 14 may include a co-generation system that utilizes heat generated during power generation.

The naturally fluctuating power source 15 is power generation equipment in which a power generation output fluctuates depending on the weather conditions, and outputs generated power to the microgrid MG. Although solar power generation equipment (a solar panel) is exemplified in FIG. 1, an example of the naturally fluctuating power source 15 may include wind power generation equipment instead of or in addition to the solar power generation equipment.

The energy storage system 16 is a stationary power accumulation device that accumulates power generated by a naturally fluctuating power source 15 and the like. The power accumulation device is a secondary battery, such as a lithium-ion battery or a nickel-hydrogen battery, and for example, a traveling battery (a recycled product) that has been mounted on a vehicle in the past can be used. However, an example of the energy storage system 16 is not limited to the secondary battery, and may be a power-to-gas device that produces a gaseous fuel (for example, hydrogen and methane) using surplus power.

The EVSE 17 is a charging station configured to execute at least one of the charging of the vehicle 18 and the discharging of the vehicle 18. The EVSE 17 may be a home charger. The EVSE 17 may be electrically connected to the microgrid MG and configured to execute discharging (supply power) to the microgrid MG.

Specifically, the vehicle 18 is a plug-in hybrid vehicle (PHV), a battery electric vehicle (BEV), or the like. The vehicle 18 is configured to receive power from the microgrid MG when a charging cable extending from the EVSE 17 is connected to an inlet (an inlet 169 of FIG. 3) of the vehicle 18 (external charging). The vehicle 18 may be configured to supply power to the microgrid MG when the charging cable is connected to an outlet (not shown) of the vehicle 18 (external power supply). The vehicle 18 is also referred to as an "electrified vehicle".

The heat accumulation system 19 includes a heat storage tank provided between a heat source machine and a load (for example, air conditioning equipment), and is configured to temporarily accumulate a liquid medium in the heat accumulation tank in a heat retaining state. By using the heat accumulation system 19, generation and consumption of heat can be mismatched in time. For example, heat generated by consuming power and operating a heat source machine at night can be accumulated in the heat accumulation tank, and the heat can be consumed for air conditioning in the daytime.

The charging/discharging lane 9 executes at least one of the charging or the discharging of the vehicle 18 in a non-contact manner. A configuration of the charging/discharging lane 9 will be described below.

In an example illustrated in FIG. 1, the FEMS 11, the BEMS 12, the HEMS 13, the generator 14, the naturally fluctuating power source 15, the energy storage system 16, the piece of EVSE 17, the vehicle 18, the heat accumulation system 19, and the charging/discharging lane 9 that are included in CEMS 1 is one, respectively, but the number of these systems or pieces of equipment is arbitrary. A plurality of these systems or pieces of equipment may be included in the CEMS 1, and there may be a system or equipment that is not included in the CEMS 1. The FEMS 11, the BEMS 12, and/or the HEMS 13 may include equipment, such as a generator, or may include electric vehicle supply equipment and a vehicle.

The CEMS server 2 is a computer that manages a power adjustment resource in the CEMS 1. The CEMS server 2 includes a control device 201, a storage device 202, and a communication device 203. The control device 201 includes a processor and is configured to execute predetermined arithmetic processing. The storage device 202 includes a memory that stores a program executed by the control device 201, and stores various pieces of information (for example, a map, a relational formula, and a parameter) used in the program. Further, the storage device 202 includes a database, and stores data (for example, a power generation history and a power consumption history) regarding power of the system or equipment included in the CEMS 1. The communication device 203 includes a communication interface, and is configured to communicate with the outside (for example, another server).

The CEMS server 2 may be an aggregator server. An aggregator is an electricity company that controls a plurality of power adjustment resources together and provides them with energy management services. The CEMS server 2 an example of a "server" of the present disclosure. Further, each of the servers (110, 120, 130) included in systems of the FEMS 11, the BEMS 12, and the HEMS 13 may be referred to as a "server" according to the present disclosure.

Power reception/conversion equipment 3 is provided at a power reception point (an interconnection point) of the microgrid MG, and is configured to be capable of switching between parallel (connection) and separation (disconnection) between the microgrid MG and the power system 4. Although not shown, the power reception/conversion equipment 3 includes a high-voltage side (primary side) switchgear, a transformer, a protection relay, a measuring device, and a control device. When the microgrid MG is connected to the power system 4, the power reception/conversion equipment 3 receives alternating current power of, for example, a special high voltage (voltage exceeding 7,000 V) from the power system 4, steps down the received power, and supplies it to the microgrid MG.

The power system 4 is a power network composed of a power plant, and power transmission/distribution equipment. In the present embodiment, a power company serves as both a power generation company and a power transmission/distribution company. The power company corresponds to a general power transmission/distribution company and a manager of the power system 4, and maintains and manages the power system 4.

The power transmission/distribution company server 5 is a computer that belongs to the power company and manages the power supply and demand of the power system 4. The power transmission/distribution company server 5 is also configured to be capable of bidirectionally communicating with the CEMS server 2.

Figure 2:
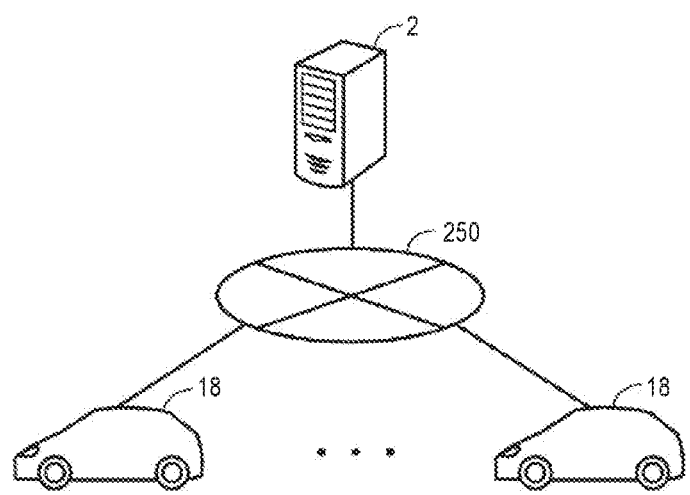
FIG. 2 is a diagram illustrating a communication system of the present embodiment.

FIG. 2 is a diagram for describing a communication system of the present embodiment. In an example of FIG. 2, the CEMS server 2 is connected to one or more vehicles 18 by a network 250. The CEMS server 2 and one or more vehicles 18 can communicate with each other via the network 250.

Configuration of Vehicle and Charging/Discharging Lane

Figure 3:
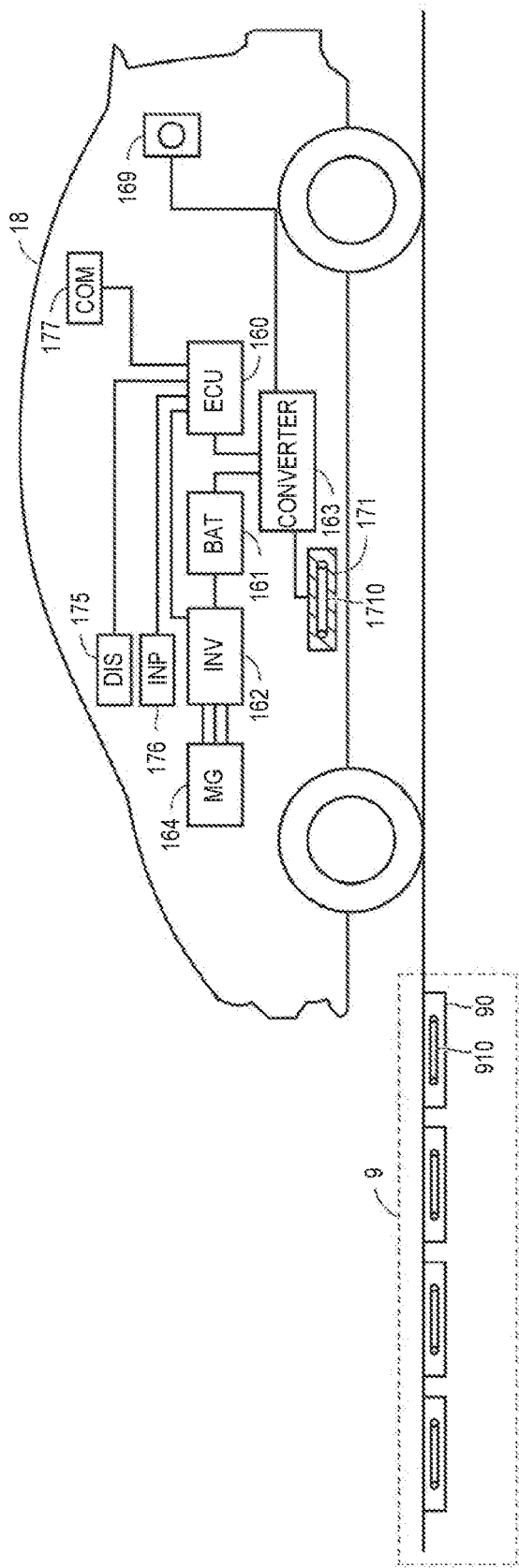
FIG. 3 is a diagram illustrating an example of a configuration of each of a vehicle and a charging or discharging lane according to the present embodiment.

FIG. 3 is a diagram illustrating an example of a configuration of each of the vehicle 18 and the charging/discharging lane 9 according to an embodiment. The vehicle 18 includes an ECU 160, a battery 161, an inverter 162, a converter 163, a motor generator 164, an inlet 169, and a power transmission/reception device 171. Further, the charging/discharging lane 9 includes one or more power transmission units 90 and a controller 95.

The electronic control unit (ECU) 160 includes a processor, such as a central processing unit (CPU), and a memory, such as a read-only memory (ROM) and a random access memory (RAM). The processor is configured to execute predetermined arithmetic processing described in a program. The memory stores a program executed by a processor 111. Further, the memory temporarily stores data generated by the execution of the program in the processor 111 and data input via a communication device 177. In the present embodiment, the memory stores contents information (contents information 316 of FIG. 6) indicating the contract contents of the vehicle 18 having the memory.

The battery 161 is an assembled battery including a plurality of cells. Each cell is a secondary battery, such as a lithium-ion battery or a nickel-hydrogen battery. The battery 161 supplies power used for generating a drive force of the vehicle 18 to a motor generator 164 via the inverter 162. Further, the battery 161 accumulates power generated by the motor generator 164. The battery 161 is provided with a voltage sensor and a current sensor (neither shown) for the ECU 160 to calculate a state of charge (SOC) of the battery 161.

According to a control of the ECU 160, the inverter 162 converts direct current power accumulated in the battery 161 into alternating current power and supplies the alternating current power to the motor generator 164. Further, according to the control of the ECU 160, the inverter 162 converts alternating current power (regenerative power) from the motor generator 164 into direct current power and charges the battery 161 with the direct current power.

According to the control of the ECU 160, the converter 163 converts alternating current power received by the power transmission/reception device 171 into direct current power and charges the battery 161 with the direct current power. According to the control of the ECU 160, the converter 163 converts direct current power accumulated in the battery 161 into alternating current power and transmits the alternating current power from the power transmission/reception device 171 to the charging/discharging lane 9. Further, the power transmission/reception device 171 is an example of a "power device" of the present disclosure.

The motor generator 164 causes the vehicle 18 to travel by receiving power supplied from the inverter 162 and applying a rotational force to drive wheels. Further, as described above, a connector of the EVSE 17 is inserted into the inlet 169 by the user.

The power transmission/reception device 171 is arranged in, for example, a lower portion of the vehicle 18. The power transmission/reception device 171 includes a power transmission/reception coil 1710. The vehicle 18 receives (charges) power output from the charging/discharging coil 910 of the charging/discharging lane 9 by electromagnetic induction in a non-contact manner by the power transmission/reception coil 1710. Further, the vehicle 18 transmits (discharges) power to the charging/discharging coil 910 of the charging/discharging lane 9 by electromagnetic induction in a non-contact manner by the power transmission/reception coil 1710.

Further, when the CEMS server 2 or the like charges the vehicle 18, it sends a signal indicating the charging of the vehicle 18 to a control device (not shown) of the charging/discharging lane 9. As such, the control device of the charging/discharging lane 9 specifies the charging of the vehicle 18. Further, when the CEMS server 2 or the like discharges the vehicle 18, it sends a signal indicating the discharging of the vehicle 18 to the control device of the charging/discharging lane 9. As such, the control device of the charging/discharging lane 9 specifies the discharging of the vehicle 18.

The vehicle 18 further includes a communication device 177, a display device 175, and an input device 176. The ECU 160 communicates with an external device (for example, the CEMS server 2) via the communication device 177. Further, by the control of the ECU 160, the display device 175 displays various images. Further, a user's command is input to the input device 176. In the present embodiment, the display device 175 and at least a part of the input device 176 integrally form a touch panel. The touch panel has a navigation function that indicates a way to a destination to the user (for example, a driver). Further, the input device 176 may include a hard key (for example, a button).

FIG. 3 illustrates an example of a configuration where one ECU 160 controls a control target (the converter 163, the display device 175, and the input device 176). However, the ECU 160 does not have to control all of these control targets. For example, another ECU may control a control target that is not controlled by the ECU 160.

Simultaneous/Commensurate Amount and Contract

A contract is concluded between a manager of the CEMS 1 and the power company that maintains and manages the power system 4. The contract is regarding a power amount supplied from the power system 4 to the microgrid MG for every predetermined period (for example, every 30 minutes). According to the contract, the CEMS server 2 needs to adjust an actual power amount such that an actual power supply amount (an actual power amount) from the power system 4 to the microgrid MG substantially matches a power supply amount planned in advance (a planned power amount). A control for this adjustment is referred to as a "simultaneous/commensurate amount", and, in particular, when the period is 30 minutes, it is referred to as a "30 minute simultaneous/commensurate amount".

A target period of the simultaneous/commensurate amount is not limited to 30 minutes. The target period of the simultaneous/commensurate amount may be shorter than 30 minutes (for example, 10 minutes) or longer than 30 minutes (for example, 1 hour). The target period for the simultaneous/commensurate amount can be arbitrarily determined by a contract.

Further, in order to achieve the simultaneous/commensurate amount, the vehicle 18 included in the power management system 100 is contracted. Here, the contract is typically concluded between, for example, a contract manager and the user of the vehicle 18. In the present embodiment, the contract manager may be, for example, a manager of the CEMS server 2. Further, it may be expressed, "The contract is concluded between the server (for example, the CEMS server 2) managed by the contract manager and the vehicle 18".

Further, in the present embodiment, the contract contents define a charging/discharging amount, a charging/discharging period, provisional EVSE, and a user ID (identification). At least one of a charging amount or a discharging amount is defined as the charging/discharging amount. At least one of a charging period or a discharging period is defined as the charging/discharging period. Hereinafter, at least one of the charging and the discharging is also referred to as "charging/discharging". The provisional EVSE may be, for example, information indicating an ID or a position of the provisional EVSE. As will be described below, it is recommended that the contracted vehicle 18 be charged/discharged in the provisional EVSE, but it may be charged/discharged in the charging/discharging lane 9, which is different from the provisional EVSE. The "provisional EVSE" is an example of "EVSE set in the contract contents" of the present disclosure. Further, the provisional EVSE charges or discharges the vehicle 18 in a contact (for example, using a connector) or a non-contact manner.

The charging/discharging amount and the charging/discharging period are a power amount and a period needed to achieve the simultaneous/commensurate amount. The charging/discharging amount, the charging/discharging period, and the provisional EVSE are calculated (derived) using a predetermined algorithm by the CEMS server 2 or the like. As such, the contract contents define the charging/discharging amount and the charging/discharging period. In the present embodiment, a configuration where the charging/discharging is "charging" will be mainly described. In other words, a configuration where the contract contents define the charging amount, the charging period, the provisional EVSE, and the user ID will be described. The charging period is composed of a charging start time and a charging end time. Further, the charging start time is also simply referred to as a "start time", and the charging end time is also simply referred to as an "end time".

Further, when a user corresponding to a user ID defined in the contract contents has executed the charging of a contracted charging/discharging power amount, or has executed the discharging of the charging/discharging power amount, the user is given a predetermined benefit. The predetermined benefit may be, for example, cash. In other words, when the user has executed the charging by the contracted charging/discharging power amount, the user can execute the charging at a lower price than a price of charging by a normal method. The normal method is a method where no contract is concluded. Further, when the user has executed the discharging by removing the contracted charging/discharging power amount, the user can sell power to the manager or the like of the power system 4 at a higher price than a price of charging by the normal method. Such a benefit motivates a user to participate in the power management system 100.

Further, as described above, the contract is defined to achieve the simultaneous/commensurate amount. Therefore, when the contract is violated, the simultaneous/commensurate amount may not be achieved, and the power supply and demand balance in the power management system 100 may be disturbed. The violation of the contract may be, for example, a case where the vehicle 18 is not charged in the provisional EVSE at the charging start time defined in the contract contents. Such a case may be, for example, a case where a driver of the vehicle 18 unintentionally misses the charging start time due to sudden road congestion.

When the vehicle 18 misses the charging start time due to the sudden road congestion, the user of the vehicle 18 violates the contract of the vehicle. However, it is harsh to impose a penalty even in such a case. Therefore, in the present embodiment, the contracted vehicle 18 determines whether it is predicted to, before the start time of the charging period, be unable to execute the contracted contents in the provisional EVSE. The provisional EVSE may be, for example, EVSE 17. Then, in a case where the vehicle 18 is not predicted to be unable to execute the contract contents in the provisional EVSE, when it reaches the charging/discharging lane 9 as substitute equipment and executes the charging in the charging/discharging lane 9 (the contract contents are executed), the CEMS server 2 does not impose a penalty on the user of the vehicle 18. As such, it is possible to execute the charging in the charging/discharging lane 9 instead of the charging by the provisional EVSE, and thus it is possible to restrict the power supply and demand balance in the VPP from being disturbed. Further, the power management system 100 restricts imposing a penalty on the user for violating the contract contents.

Further, when the vehicle 18 does not exist in the charging/discharging lane 9 as the substitute equipment by the start time of the charging period, the CEMS server 2 can make a request to a substitute vehicle, which is different from the vehicle 18. Then, when the substitute vehicle is charged in the charging/discharging lane 9, charging processing is executed by the substitute vehicle instead of the user of the vehicle 18, such that a penalty is not imposed on the user thereof. As such, the charging is executed in the charging/discharging lane 9 instead of the charging in the provisional EVSE, and thus it is possible to restrict the power supply and demand balance in the VPP from being disturbed. Further, the power management system 100 restricts a penalty for violating the contract contents from being imposed on the user. Hereinafter, the contracted vehicle is also referred to as a "subject vehicle", and the substitute vehicle is also referred to as "another vehicle".

In the present disclosure, "executing the contract contents" includes the following three executions. A first execution means charging the subject vehicle with the charging amount defined in the contract contents of the subject vehicle in the provisional EVSE defined in the contract contents at the start time defined in the contract contents. A second execution means charging the subject vehicle in the charging/discharging lane 9, which is different from the provisional EVSE defined in the contract contents of the subject vehicle at the start time defined in the contract contents. A third execution means charging the another vehicle in the charging/discharging lane 9, which is different from the provisional EVSE defined in the contract contents of the subject vehicle at the start time defined in the contract contents. By executing any of the first to third executions, the penalty for violating the contract contents is not imposed on the user. In the second execution and the third execution, when the charging amount with which the vehicle has been charged is smaller than the charging amount defined in the contract contents, it is assumed that the second execution and the third execution have been executed. On the other hand, when the contracted vehicle has not executed any of the first to third executions, a penalty for violating the contracted contents is imposed on the user of the vehicle.

Table

The CEMS server 2 has various tables. The tables are also referred to as databases (DB). FIG. 4 is an example of a vehicle DB. The user of the vehicle 18 who is not participating in the power management system 100 sends an application for participating in the power management system 100 to the manager or the like of the power management system 100. When the manager or the like of the power management system 100 approves the participation application, the vehicle 18 is given a vehicle ID and registered in a vehicle table. As such, the vehicle ID is information associated with the vehicle 18, and is information for the CEMS server 2 to recognize the vehicle 18. The vehicle ID includes an ID of the subject vehicle and an ID of the another vehicle that are described above.

Further, the vehicle ID is associated with a position of the vehicle, the contract contents, and the presence/absence of a contract violation. The position of the vehicle is information indicating a current position of the vehicle. The position of the vehicle is coordinate information including, for example, the longitude and the latitude. The CEMS server 2 specifies a latest position (latest position information) of the vehicle 18 at a predetermined time (for example, 1 second) based on, for example, global positioning system (GPS) information. In other words, the position of the vehicle in the vehicle DB is updated at every predetermined time (for example, 1 second).

As described above, the contract contents include the provisional EVSE ID, the above-described charging amount, and the above-described charging period. The provisional EVSE ID is identification information of the provisional EVSE. The CEMS server 2 can define a position of the provisional EVSE based on the provisional EVSE ID. The position of the provisional EVSE is coordinate information including the longitude and the latitude. The contract contents of FIG. 4 define the charging/discharging amount and the charging/discharging period. Further, although the provisional EVSE is defined in the contract contents, a main charging facility is not defined. A penalty is imposed on the user when the charging is executed in a facility, which is different from the main charging facility. In the present embodiment, even when the charging is executed in a charging/discharging lane, which is different from the provisional EVSE, no penalty is imposed on the user. Therefore, it is possible to enhance a degree of freedom in the charging of the contract contents.

The presence/absence of the contract violation is information indicating whether the contracted vehicle has violated the contract contents. For example, when the above-described first to third executions are executed, since the contract contents are not violated, "violation absent" is associated. Further, when none of the above-described first to third executions are executed, since the contract contents are violated, "violation present" is associated.

The presence/absence of the contract violation is given in association with the vehicle ID at a predetermined giving timing (for example, the end time of the charging period) after the start time of the charging period. Further, the user of the vehicle indicated by the vehicle ID that has been determined to have a contract violation (that is, violation present) is given a violation flag (not shown) in association with the user ID of the user. The above-described penalty is imposed on the user to which the violation flag is given.

FIG. 4 illustrates an example where a vehicle position of a vehicle having a vehicle ID of C1 is P1. Further, the contract contents of the vehicle having the vehicle ID of C1 indicate that a provisional EVSE ID is µl, a charging amount is M1, and a charging period is K1. Further, as the presence/absence of a contract violation of the vehicle having the vehicle ID of C1, "violation absent" is associated.

Further, as the presence/absence of a contract violation of a vehicle having a vehicle ID of C2, "violation present" is associated. Further, as the presence/absence of a contract violation of a vehicle having a vehicle ID of C3, a blank space (a symbol –) is associated. The blank space indicates that the presence/absence of a contract violation has not been determined, and means that the current time may be, for example, before the start time of the contract period. Then, the vehicle having the vehicle ID of C3 is given any of "violation absent" and "violation present" at the giving timing.

Although the vehicle ID is defined in the vehicle DB of FIG. 4, a user ID may be defined instead of the vehicle ID. As described above, based on the vehicle DB, the CEMS server 2 can grasp the position, the contract contents, and the like of the vehicle participating in the power management system 100.

FIG. 5 is an example of a charging/discharging lane DB. The charging/discharging lane DB indicates a charging/ discharging lane ID and a range of the charging/discharging lane associated with the charging/discharging lane ID. The charging/discharging lane ID is identification information indicating the charging/discharging lane. Further, the range of the charging/discharging lane indicates, for example, a range of an area occupied by the charging/discharging lane. The range of charging/discharging lanes may be indicated by, for example, a range of the latitude and a range of the longitude. In the present embodiment, the charging/discharging lane DB defines S charging/discharging lanes (S is an integer of 1 or higher).

Functional Block Diagram

Figure 6:
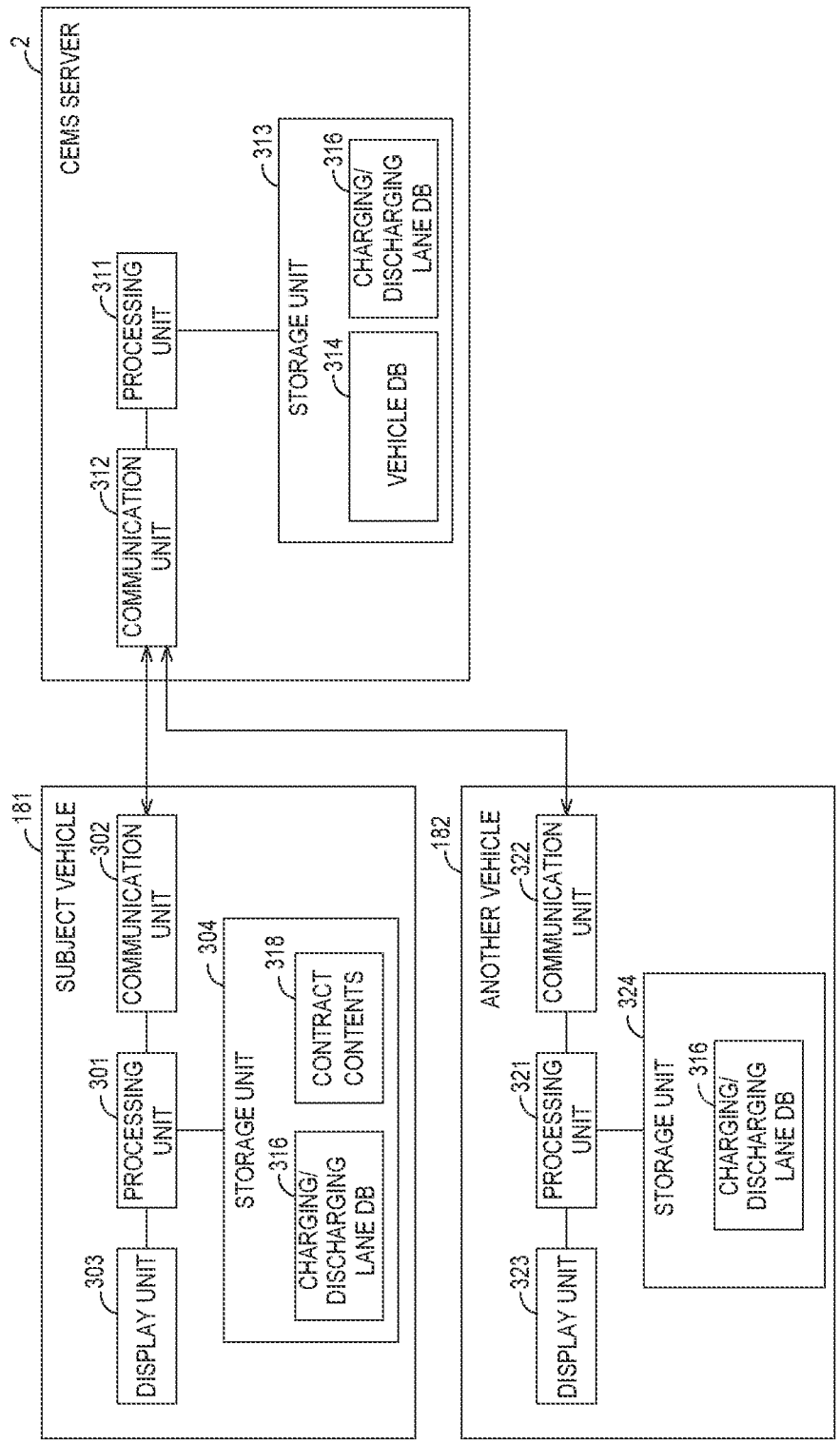
FIG. 6 is a functional block diagram of a subject vehicle, another vehicle, and a CEMS server.

FIG. 6 is a functional block diagram of an above-described subject vehicle 181, above-described another vehicle 182, and the CEMS server 2.

The subject vehicle 181 includes a processing unit 301, a communication unit 302, a display unit 303, and a storage unit 304. The another vehicle 182 includes a processing unit 321, a communication unit 322, a display unit 323, and a storage unit 324. The CEMS server 2 includes a processing unit 311, a communication unit 312, and a storage unit 313. The storage unit 313 stores a vehicle DB 314 (see FIG. 4) and a charging/discharging lane DB 316 (see FIG. 4).

The processing unit 301 of the subject vehicle 181 and the processing unit 321 of the another vehicle 182 correspond to the CPU included in the ECU 160 (FIG. 3). The communication unit 302 of the subject vehicle 181 and the communication unit 322 of the another vehicle 182 correspond to the communication device 177 (FIG. 3). The display unit 303 of the subject vehicle 181 and the display unit 323 of the another vehicle 182 correspond to the display device 175 (FIG. 3). The storage unit 304 of the subject vehicle 181 and the storage unit 304 of the another vehicle 182 correspond to the ROM, the RAM, and the like included in the ECU 160.

The processing unit 311 of the CEMS server 2 corresponds to the control device 201 (FIG. 1). The communication unit 312 of the CEMS server 2 corresponds to the communication device 203 (FIG. 1). The storage unit 313 of the CEMS server 2 corresponds to the storage device 202 (FIG. 1).

The processing unit 301 of the subject vehicle 181 executes various determinations, generation of various signals, and display control of the display unit 303. The communication unit 302 of the subject vehicle 181 receives various signals from the CEMS server 2. Further, the communication unit 302 sends a signal or the like generated by the processing unit 301 to the CEMS server 2.

The processing unit 321 of the another vehicle 182 executes various determinations, generation of various signals, and the display control of the display unit 303. The communication unit 322 of the another vehicle 182 receives various signals from the CEMS server 2. Further, the communication unit 322 sends a signal or the like generated by the processing unit 321 to the CEMS server 2.

The communication unit 312 of the CEMS server 2 receives various signals from the vehicle 18 (the subject vehicle 181, the another vehicle 182, or the like). The processing unit 311 executes various determinations and generation of various signals based on the signals received by the communication unit 312, the vehicle DB 314, the charging/discharging lane DB 316, and the like.

Further, the storage unit 304 of the subject vehicle 181 and the storage unit 324 of the another vehicle 182 store the charging/discharging lane DB 316. Further, the storage unit 304 of the subject vehicle 181 stores content information 316 indicating the contract contents of the subject vehicle 181. When the subject vehicle 181 is contracted, the communication unit 302 of the subject vehicle 181 acquires the content information 316 from the CEMS server 2 and the like. Then, the processing unit 301 stores the content information 316 in the storage unit 304.

Flowchart of Power Management System

Figure 7:
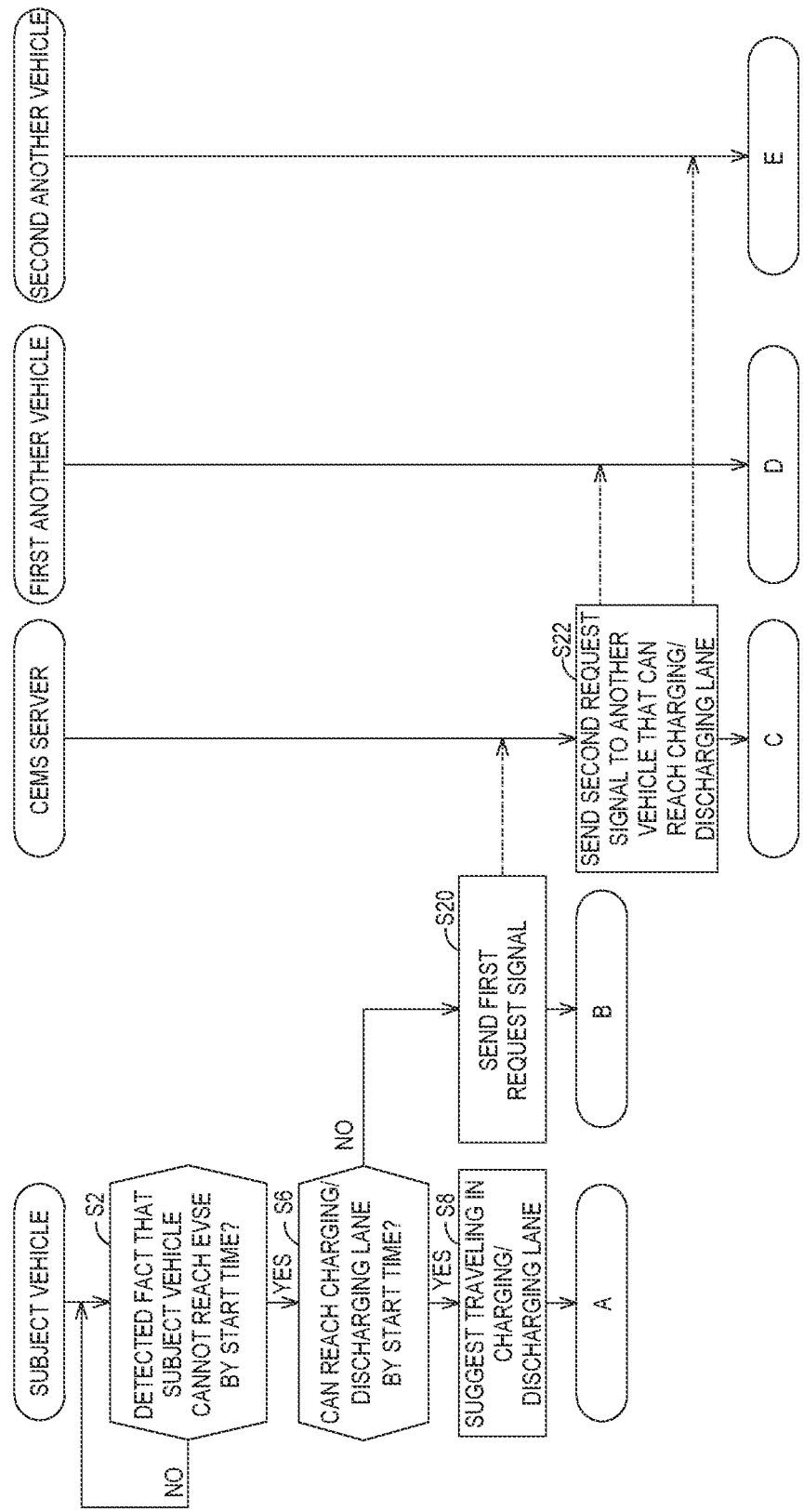
FIG. 7 is a flowchart of processing of a first half of the power management system.
Figure 8:
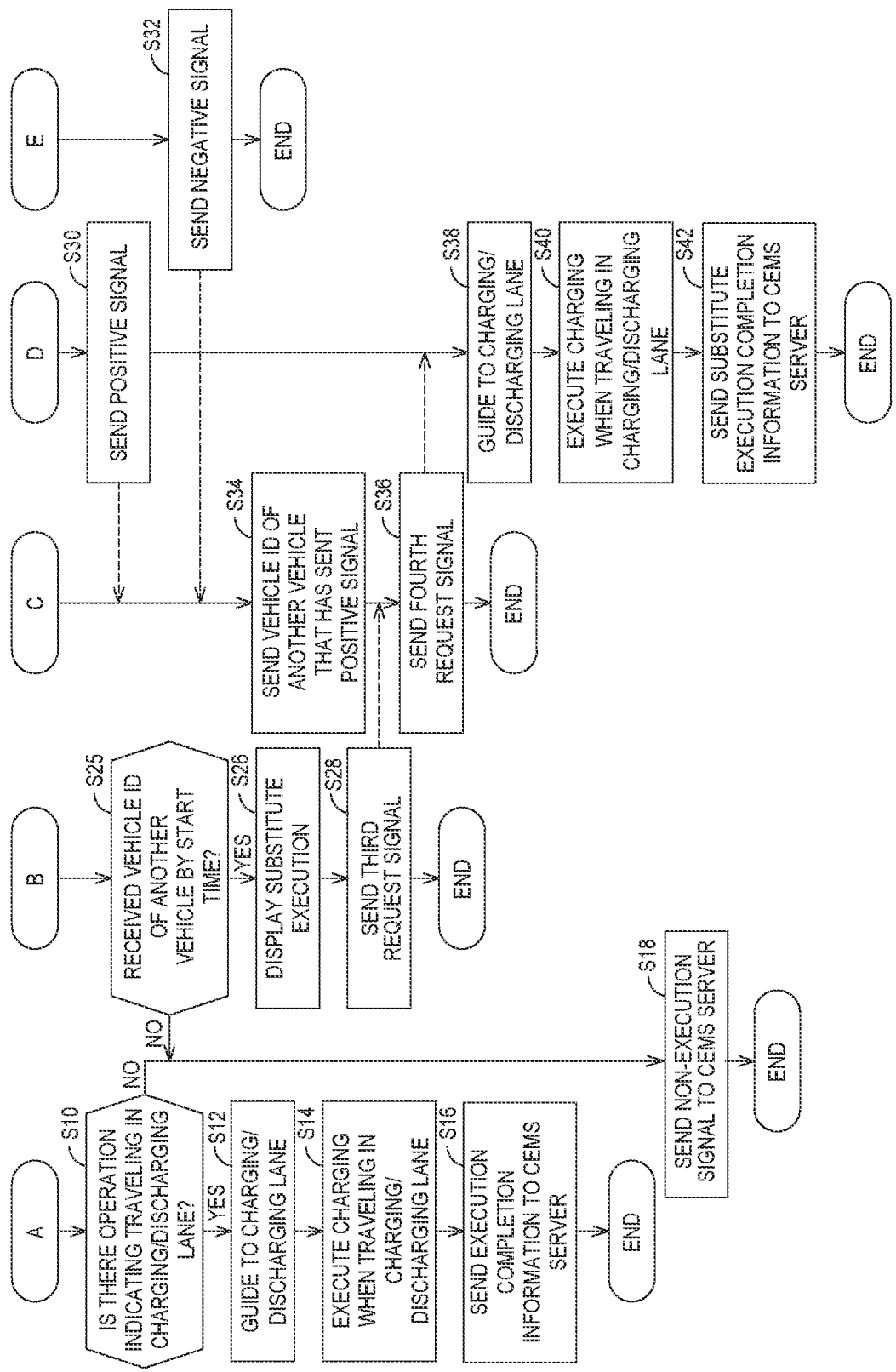
FIG. 8 is a flowchart of processing of a second half of the power management system.

FIG. 7 is a flowchart of processing of a first half of the power management system 100, and FIG. 8 is a flowchart of processing of a second half of the power management system 100. Further, as described above, the subject vehicle of FIGS. 7 and 8 is a contracted vehicle. Further, when the vehicle is contracted, the vehicle becomes the subject vehicle and the flowchart is executed. Further, the processing of FIGS. 7 and 8 is mainly executed by the processing unit 301 of the subject vehicle 181, the processing unit 311 of the CEMS server 2, and the processing unit 321 of the another vehicle 182.

First, in step S2, the subject vehicle 181 determines, before the start time of the charging period, whether it can execute the contracted contents in the provisional EVSE set in the contracted contents. More specifically, the subject vehicle 181 detects whether it can reach the provisional EVSE at the start time. Regarding the detection method, for example, the subject vehicle 181 acquires the current position of the subject vehicle 181, the current time, the position of the provisional EVSE defined in the contract contents, and the start time defined in the contract contents. Then, the subject vehicle 181 calculates a needed time required to travel from the current position of the subject vehicle 181 to the position of the provisional EVSE. Further, the subject vehicle 181 calculates a difference time by subtracting the current time from the start time. The difference time is calculated in consideration of road congestion or the like.

Then, the subject vehicle 181 compares the difference time with the needed time. When the needed time is longer than the difference time, the vehicle 18 cannot reach the provisional EVSE at the start time, and thus a determination in step S2 is YES. On the other hand, when the needed time is equal to or shorter than the difference time, the vehicle 18 can reach the provisional EVSE before the start time, and thus the determination in step S2 is NO. When congestion or the like occurs between the current position and the position of the provisional EVSE, the needed time becomes longer. Therefore, a case where the subject vehicle 181 cannot reach the provisional EVSE at the start time due to sudden congestion or the like occurs.

When subject vehicle 181 is predicted to, before the start time of the charging period, be unable to execute the contract contents in the provisional EVSE set in the contract content, that is, when the determination is YES in step S2, the process proceeds to step S6. On the other hand, when the subject vehicle 181 is predicted to, before the start time of the charging period, be able to execute the contract contents in the provisional EVSE set in the contract content, that is, when the determination is NO in step S2, the process stands by until the determination becomes YES in step S2.

In step S6, the subject vehicle 181 determines whether it can reach the charging/discharging lane 9, which is different from the provisional EVSE, by the start time. The subject vehicle 181 makes a determination in step S6 with reference to, for example, the charging/discharging lane DB 316 stored in the storage unit 304. More specifically, the subject vehicle 181 calculates a needed time (that is, S pieces of needed times) from its current position to each position of all S charging/discharging lanes 9 defined in the charging/discharging lane DB 316. Then, the subject vehicle 181 compares each of the S needed times with the difference time. The charging/discharging lane 9 of which the needed time is shorter than the difference time is a charging/discharging lane 9 which the subject vehicle 181 can reach by the start time. As such, when a charging/discharging lane 9 which the subject vehicle 181 can reach by the start time exists, that is, when the subject vehicle 181 is predicted to be able to reach, before the charging period, the charging/discharging lane 9 in which the contract contents can be executed (YES in step S6), the process proceeds to step S8. On the other hand, when a charging/discharging lane 9 which the subject vehicle 181 can reach by the start time does not exist, that is, when the subject vehicle 181 is predicted to be unable to reach, before the charging period, the charging/discharging lane 9 in which the contract contents can be executed (NO in step S6), the process proceeds to step S20.

In step S8, the subject vehicle 181 suggests traveling in the charging/discharging lane 9 which is determined to be reachable in step S6. Specifically, the subject vehicle 181 displays a suggestion image on the display unit 303.

Figure 9:
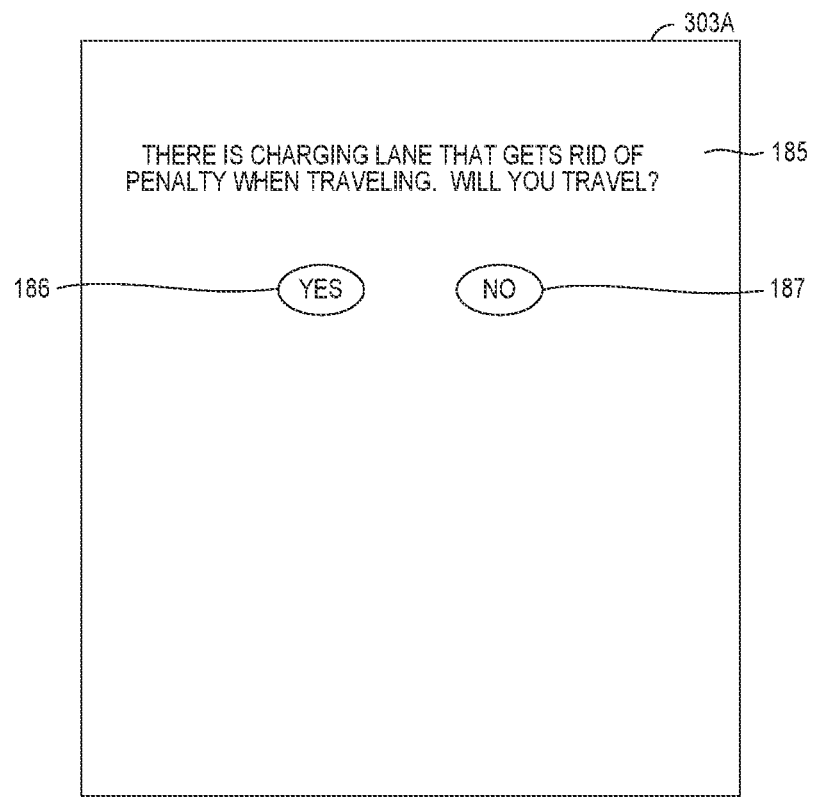
FIG. 9 is a diagram illustrating an example of a suggestion image.

FIG. 9 is an example of a suggestion image. The suggestion image is displayed in a display area 303A of the display unit 303. On the suggestion image of FIG. 9, a text image 185, a YES button 186, and a NO button 187 are displayed. The text image 185 is an image indicating that traveling in the charging/discharging lane 9 is suggested. In the example of FIG. 9, the text image 185 shows "Will you travel in a charging lane that gets rid of a penalty when traveling?" When a user will travel in the suggested charging/discharging lane 9, the user (for example, a driver) of the subject vehicle 181 operates the YES button 186. On the other hand, when the user will not travel in the suggested charging/discharging lane 9 (for example, when detouring), the user (for example, the driver) of the subject vehicle 181 operates the NO button 187. The suggestion of traveling in the charging/discharging lane 9 may be executed by a voice output or the like.

Next, in step S10 of FIG. 8, the subject vehicle 181 determines whether the operation indicating traveling in the charging/discharging lane 9 has been executed. When the YES button 186 has been operated, that is, when it has been determined that the operation indicating traveling in the charging/discharging lane 9 has been executed (YES in step S10), the process proceeds to step S12. On the other hand, when the NO button 187 has been operated, that is, when it has been determined that the operation indicating that non-traveling in the charging/discharging lane 9 has been executed (NO in step S10), the process proceeds to step S18.

In step S12, the subject vehicle 181 guides the user to cause the subject vehicle 181 to travel in the charging/discharging lane. Specifically, the subject vehicle 181 displays a guidance image on the display unit 303.

Figure 10:
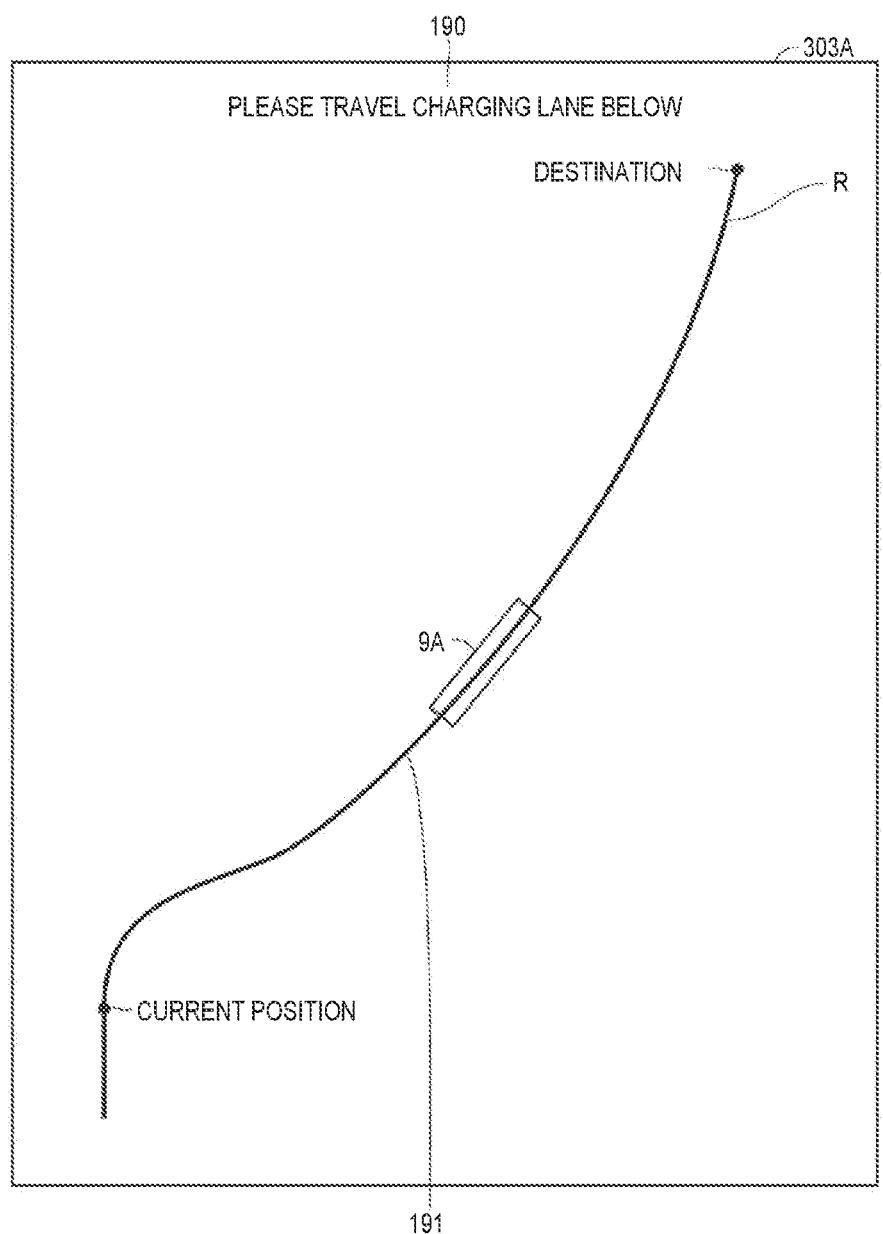
FIG. 10 is a diagram illustrating an example of a guidance image.

FIG. 10 is an example of the guidance image. The guidance image is displayed in the display area 303A of the display unit 303. The guidance image of FIG. 10 displays a text image 190 and a navigation image 191. The navigation image 191 shows a route from the current position to the destination. Further, on the route shown on the navigation image 191, an image 9A is displayed as a lane image showing (imitating) the charging/discharging lane 9.

As such, when the subject vehicle 181 is predicted to, before the start of the charging/discharging period of the subject vehicle 181, be unable to execute the contract contents in the EVSE (YES in step S2), it guides its user to travel in the charging lane. Therefore, the subject vehicle 181 guides its user to travel in the charging/discharging lane, and thus it is possible to easily execute the contract contents of the user of the subject vehicle 181.

When the guidance image is displayed in step S12 and the subject vehicle 181 travels in the charging/discharging lane 9 in step S14, the charging/discharging lane 9 charges the subject vehicle 181. Next, in step S16, when the subject vehicle 181 has executed (the charging has been ended) the contract contents in the charging/discharging lane 9 (the charging/discharging lane which the subject vehicle 181 can reach before the charging period), it sends execution completion information to the CEMS server 2. The execution completion information includes the vehicle ID of the contracted subject vehicle 181 and information indicating that the contracted subject vehicle 181 has executed the contract contents.

Upon receiving the execution completion information, the CEMS server 2 gives "violation absent" for the "presence/absence of contract violation" corresponding to the vehicle ID included in the execution completion information in the vehicle DB (see FIG. 4). As such, no penalty is imposed on the user of the subject vehicle 181 corresponding to the vehicle ID. As such, when the subject vehicle 181 has executed (the charging has been ended) the contract contents in the charging/discharging lane 9 (the charging/discharging lane which the subject vehicle 181 can reach before the charging period), the CEMS server 2 can recognize that the contract contents have been executed.

Generally, the user of the contracted subject vehicle 181 causes the subject vehicle 181 to travel such that it reaches the EVSE by the start time defined in the contract contents. However, there is a case where the subject vehicle 181 cannot be charged/discharged in the provisional EVSE. This case may be, for example, a case where the subject vehicle 181 is not in the EVSE due to sudden road congestion or the like.

In a case as above, when the subject vehicle 181 cannot be charged/discharged in the EVSE, a penalty is imposed on the user of the subject vehicle 181, which is harsh for the user. Therefore, when the subject vehicle 181 is predicted to, before the start time, be unable to execute the contract contents in the provisional EVSE (YES in step S2), it executes the contract contents in a charging/discharging lane, which is different from the provisional EVSE and which the vehicle can reach at the start time, such that no penalty is imposed (see steps S14 and S16). Therefore, when it is predicted that the contract contents cannot be executed in the provisional EVSE, by executing the contract contents in the charging/discharging lane 9, the power management system 100 can restrict a penalty for violating the contract contents from being imposed on the user. Further, the subject vehicle 181 executes the charging with at least a part of the charging amount of the contract contents in the charging/discharging lane 9, and thus it is possible to restrict the above-described power supply and demand balance from being significantly disturbed. Further, the subject vehicle 181 can execute the charging by traveling in the charging/discharging lane 9, and thus it is possible for the subject vehicle 181 to appropriately execute the contract contents without causing the user of the subject vehicle 181 to execute special processing (for example, processing for connecting a connector to the subject vehicle 181).

Further, a configuration where, when the subject vehicle 181 has executed the contract contents in the charging/discharging lane 9, a communication device (not shown) of the charging/discharging lane 9 sends contract completion information to the CEMS server 2 is considered. However, in this configuration, the charging/discharging lane 9 needs to include a communication function where the charging/discharging lane 9 sends the contract completion information to the CEMS server 2, and the configuration of the power management system 100 can be complicated. On the other hand, in the present embodiment, the subject vehicle 181 sends the contract completion information to the CEMS server 2, and thus the charging/discharging lane 9 does not have to send the execution completion information to the CEMS server 2. Therefore, the charging/discharging lane 9 does not have to include the above-described communication function, and thus it is possible to simplify the configuration of the power management system 100.

In the period in which the determination of NO is being repeatedly made in step S2, when the subject vehicle 181 executes the contract contents, that is, even when it executes the charging in the provisional EVSE of the contract contents at the start time of the execution of contract contents, the subject vehicle 181 sends the execution completion information to the CEMS server 2.

Further, in step S18, the subject vehicle 181 sends a non-execution signal to the CEMS server 2. The non-execution signal includes the vehicle ID of the contracted subject vehicle 181 and information indicating that the contracted subject vehicle 181 has not executed the contract contents. Upon receiving the non-execution information, the CEMS server 2 gives "violation present" for the "presence/absence of contract violation" corresponding to the vehicle ID included in the non-execution information in the vehicle DB (see FIG. 4). Thereafter, a penalty is imposed on the user of the subject vehicle 181 corresponding to the vehicle ID.

Further, in step S6, when the determination is NO, that is, when the charging/discharging lane in which the subject vehicle 181 can execute the charging by the start time does not exist, in step S20, the subject vehicle 181 generates a first request signal and the communication unit 302 sends the first request signal to the CEMS server 2. Here, the first request signal is a signal for requesting the another vehicle 182 (the substitute vehicle) chargeable/dischargeable in any of a plurality of charging/discharging lanes defined in the lane DB to execute the charging/discharging based on the contract contents of the subject vehicle 181.

The first request signal includes the vehicle ID of the subject vehicle 181 that has sent the first request signal, and information requesting the another vehicle 182 to execute the charging/discharging.

Upon receiving the first request signal, in step 522, the CEMS server 2 sends a second request signal to the another vehicle 182 that can reach the charging/discharging lane. A method of determining the another vehicle 182 that can reach the charging/discharging lane 9 will be described.

The CEMS server 2 extracts the vehicle ID included in the first request signal, and, with reference to the vehicle DB (see FIG. 4), specifies vehicles (that is, all the other vehicles) having vehicle IDs other than the above vehicle ID. Then, with reference to the vehicle DB, the CEMS server 2 specifies positions of all the other vehicles. Further, with reference to the charging/discharging lane DB, the CEMS server 2 specifies positions of all the charging/discharging lanes. Further, the CEMS server 2 extracts the start time of the contract contents corresponding to the vehicle ID included in the first request signal. Then, the CEMS server 2 determines whether another vehicle that can reach any of all the charging/discharging lanes by the start time exists among all the other vehicles. Then, when such another vehicle exists, it becomes a candidate another vehicle to execute the contract contents as a substitute. On the other hand, when such another vehicle does not exist, the subject vehicle 181 cannot execute the charging contents by the subject vehicle 181 itself, and the another vehicle 182 cannot execute the charging contents as a substitute. Therefore, in this case, although not shown in FIG. 7, the CEMS server 2 sends, to the subject vehicle 181, a notification indicating that a penalty is imposed. At the same time, the CEMS server 2 gives "contract violation present" corresponding to the vehicle ID of the subject vehicle 181.

On the other hand, when the candidate another vehicle exists, the CEMS server 2 sends a second request signal to the another vehicle. The second request signal is a signal for inquiring whether the another vehicle can execute the contract contents of the subject vehicle 181 can be executed as a substitute. In the example of FIG. 7, as the candidate another vehicle, two other vehicles (a first another vehicle and a second another vehicle) are detected. The CEMS server 2 sends the second request signal to the first another vehicle and the second another vehicle.

As such, by employing the configuration where the CEMS server 2 sends the second request signal, it is possible to request the another vehicle to execute the charging/discharging, and thus it is possible to restrict a penalty for violating the contract contents from being imposed on the user of the subject vehicle 181.

Upon receiving the second request signal from the CEMS server 2, the other vehicles (the first another vehicle and the second another vehicle) send, to the CEMS server 2, a response signal indicating whether to execute the charging/discharging based on the contract contents of the subject vehicle 181. The response signal includes a positive signal and a negative signal.

Here, the positive signal is a signal indicating that the another vehicle executes the contract contents of the subject vehicle 181 as a substitute. On the other hand, the negative signal is a signal indicating that the another vehicle does not execute the contract contents of the subject vehicle 181 as a substitute. The another vehicle that has received the second request signal determines whether to execute the contract contents of the subject vehicle 181 as a substitute. The another vehicle that has received the second request signal displays an image indicating, for example, whether to execute the contract contents as a substitute to a user. When the user has input a notification indicating execution of the contract contents as a substitute, the another vehicle of the user sends a positive signal. On the other hand, when the user has input a notification indicating non-execution of the contract contents as a substitute, the another vehicle of the user sends a negative signal. For example, when the user is satisfied with a power rate of the contract contents, the user inputs a notification indicating execution of the contract contents as a substitute, and when the user is not satisfied, the user inputs a notification indicating non-execution of the contract contents.

In an example of FIG. 8, as described in step S30, the first another vehicle that has received the second request signal replies (sends) with a positive signal to the CEMS server 2. Further, in the example of FIG. 8, as described in step S32, the second another vehicle that has received the second request signal replies (sends) with a negative signal to the CEMS server 2.

As such, by employing a configuration where the another vehicle sends a response signal, the another vehicle to which the charging has been requested as a substitute can decide whether to execute the charging, and thus it is possible to enhance the degree of freedom in the charging of the another vehicle.

In step 534, the CEMS server 2 sends, to the subject vehicle 181, the vehicle ID of the another vehicle that has sent the positive signal. The vehicle ID of the another vehicle is an example of "vehicle information indicating the substitute vehicle" of the present disclosure.

Further, in step S25, the subject vehicle 181 determines whether it has received the vehicle ID of the another vehicle by the start time of the contract contents of the subject vehicle 181. When the subject vehicle 181 has not received the vehicle ID by the start time of the contract contents of the subject vehicle 181 (NO in step S25), the process proceeds to step S18. On the other hand, when the subject vehicle 181 has received the vehicle ID by the start time of the contract contents of the subject vehicle 181 (YES in step S25), the process proceeds to step S26.

In step S26, the subject vehicle 181 gives the user of the subject vehicle 181 a notification indicating that the another vehicle (the vehicle indicated by the sent vehicle ID) executes the charging as a substitute based on the contract contents of the subject vehicle 181. In an example of step S26, the subject vehicle 181 displays a substitute execution as a notification. The display may be, for example, displaying a substitute display image.

Figure 11:
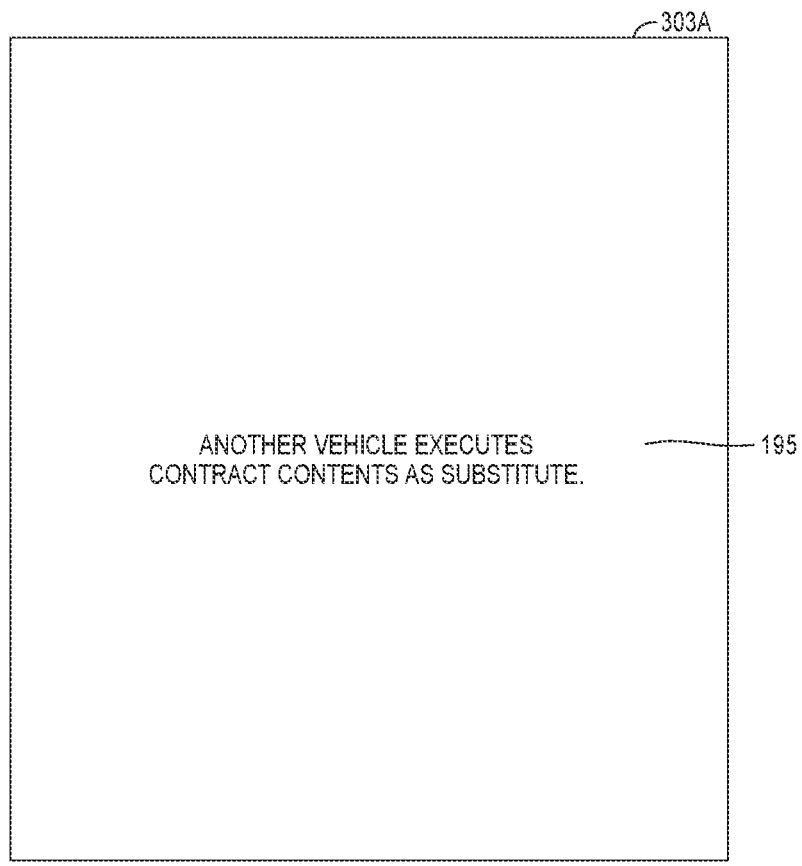
FIG. 11 is a diagram illustrating an example of a substitute display image.

FIG. 11 is an example of the substitute display image. In an example of FIG. 11, a text image 195 showing, "the another vehicle executes the contract contents as a substitute" is displayed. By displaying the text image 195, it is possible to cause the user of the subject vehicle 181 to recognize that the another vehicle 182 executes the charging based on the contract contents of the subject vehicle 181, thereby reassuring the user.

Next, in step S28, the subject vehicle 181 sends a third request signal to the CEMS server 2. The third request signal is a signal for finally requesting the another vehicle to execute the charging. Upon receiving the third request signal, the CEMS server 2 sends a fourth request signal to the another vehicle (the first another vehicle) that has sent the positive signal. As such, by employing the configuration where the CEMS server 2 sends the fourth request signal, the CEMS server 2 can cause the another vehicle to execute the charging as a substitute.

Upon receiving the fourth request signal from the CEMS server 2, the another vehicle 182 guides the user of the another vehicle 182 to travel in the charging/discharging lane 9 to execute the charging (that is, the charging defined in the contract contents of the subject vehicle 181) requested by the fourth request signal. For example, the another vehicle 182 causes the display unit 323 of the another vehicle 182 to display the guidance image described in FIG. 10. With such a configuration, it is possible to cause the another vehicle 182 to travel in the charging/discharging lane 9 to execute the charging of the subject vehicle 181 as a substitute.

Then, in step S40, when the another vehicle 182 travels in the guided charging/discharging lane 9, the another vehicle 182 executes the charging. Next, in step S42, when the another vehicle 182 has executed (the charging has been ended) the contract contents in the charging/discharging lane 9 (the charging/discharging lane which the another vehicle 182 can reach before the charging period), it sends substitute execution completion information to the CEMS server 2. The substitute execution completion information includes the vehicle ID of the another vehicle 182 and information indicating that the another vehicle 182 has executed the contract contents as a substitute.

Upon receiving the substitute execution completion information, the CEMS server 2 gives "violation absent" for the "presence/absence of contract violation" corresponding to the vehicle ID of the subject vehicle 181 of the contents executed by the substitute in the vehicle DB (see FIG. 4). As such, no penalty is imposed on the user of the subject vehicle 181 corresponding to the vehicle ID. Further, the another vehicle 182 executes the charging with at least a part of the charging amount of the contract contents, and thus it is possible to restrict the above-described power supply and demand balance from being significantly disturbed. Further, the another vehicle 182 can execute the charging only by traveling in the charging/discharging lane 9, and thus it is possible for the another vehicle 182 to appropriately execute the contract contents without causing the user of the another vehicle 182 to execute special processing.

Modified Examples (1) In the above-described embodiment, the configuration has been described where the contract contents are mainly the contents regarding the charging of the subject vehicle 181. However, the contract contents may include, for example, the contents regarding the discharging of the subject vehicle 181. With such a configuration, the same effect as that of the above-described embodiment can also be obtained.

(2) In the above-described embodiment, the configuration has been described where "a case where the subject vehicle 181 is predicted to be unable to execute the contract contents in the provisional EVSE" is a case where the subject vehicle 181 cannot reach the provisional EVSE at the start time defined in the contract contents. However, the predicted case may include other cases. Other cases include a case where, for example, a device used for executing the charging or the discharging in the provisional EVSE (for example, the inlet 169) has failed. In the "configuration where the predicted case includes such a case", for example, after the determination is YES in step S6 of FIG. 7, the subject vehicle 181 determines whether the inlet 169 has failed. Then, when the determination is YES (that is, when it is determined that the inlet 169 has failed), the process proceeds to step S20. On the other hand, when the determination is NO (that is, when it is determined that the inlet 169 has not failed), the process proceeds to step S8. By employing such a configuration, the same effect as that of the above-described embodiment can also be obtained.

(3) A subject of each process (in particular, each process in the flowcharts of FIGS. 7 and 8) described in the above-described embodiment may be substituted by another subject. For example, the determination process (the process for determining whether it is possible to reach the provisional EVSE at the start time) in step S2 may be executed by the CEMS server 2 based on the vehicle DB and the charging/discharging lane DB. Further, the guidance in step S12 and the guidance in step S38 may be executed under the control of the CEMS server 2.

The embodiment disclosed herein needs to be considered as illustrative in all points and not restrictive. The scope of the present disclosure is set forth by the claims rather than the description of the embodiments described above, and is intended to include all modifications within the meaning and scope of the claims.

What is claimed is:
1. A power management system comprising:
   a vehicle; and
   a charging or discharging lane configured to execute at least one of charging or discharging of the vehicle in a non-contact manner, wherein the vehicle is configured to:
acquire contract contents including a charging or discharging amount that defines at least one of a charging amount or a discharging amount, and a charging or discharging period that defines at least one of a charging period or a discharging period; and
execute the contract contents in a charging or discharging lane that is different from electric vehicle supply equipment set in the contract contents and is reachable before the charging or discharging period when the vehicle is predicted to, before a start of the charging or discharging period, be unable to execute the contract contents in the set electric vehicle supply equipment.

2. The power management system according to claim 1, wherein the power management system is configured to, when the vehicle is predicted to, before the start of the charging or discharging period, be unable to execute the contract contents in the set electric vehicle supply equipment, guide a user of the vehicle to travel in the charging or discharging lane.

3. The power management system according to claim 1, further comprising a server configured to communicate with the vehicle,
wherein the server is configured to, when the contract contents are executed in the charging or discharging lane which is reachable before the charging or discharging period, receive execution completion information indicating that the contract contents has been executed.

4. The power management system according to claim 3, wherein the vehicle is configured to send the execution completion information to the server.

5. The power management system according to claim 4, wherein the server is configured to, when the vehicle is predicted to, before the start of the charging or discharging period, be unable to execute the contract contents in the set electric vehicle supply equipment and be unable to reach the charging or discharging lane in which the contract contents are executable before the charging or discharging period, send a request signal for requesting a substitute vehicle chargeable or dischargeable in the charging or discharging lane to execute the charging or the discharging based on the contract contents of the vehicle.

6. The power management system according to claim 5, wherein the substitute vehicle is configured to, upon receiving the request signal from the server, send, to the server, a response signal indicating whether to execute the charging or the discharging based on the contract contents of the vehicle.

7. The power management system according to claim 6, wherein:
the server is configured to, upon receiving the response signal indicating that the charging or the discharging is executed based on the contract contents of the vehicle, send, to the vehicle, vehicle information indicating the substitute vehicle that has sent the response signal; and
the vehicle is configured to, upon receiving the vehicle information, give a user of the vehicle a notification indicating that the substitute vehicle executes the charging or the discharging based on the contract contents of the vehicle.

8. The power management system according to claim 6, wherein the server is configured to, upon receiving the response signal indicating that the charging or the discharging is executed based on the contract contents of the vehicle, send, to the substitute vehicle, a request signal for requesting that the charging or the discharging be executed based on the contract contents of the vehicle.

9. The power management system according to claim 8, wherein the substitute vehicle is configured to, upon receiving the request signal from the server, guide a user of the substitute vehicle to travel in the charging or discharging lane in which the charging or the discharging requested in the request signal is executed.

10. The power management system according to claim 1, wherein the contract contents define the charging or discharging amount and the charging or discharging period, but do not define electric vehicle supply equipment in which the charging or the discharging is executed.

11. A vehicle comprising:
a power device in which charging or discharging is executed by a charging or discharging lane configured to execute at least one of the charging or the discharging of the vehicle in a non-contact manner; and
a processor configured to:
acquire contract contents including a charging or discharging amount that defines at least one of a charging amount or a discharging amount, and a charging or discharging period that defines at least one of a charging period or a discharging period; and
execute the contract contents in a charging or discharging lane that is different from electric vehicle supply equipment set in the contract contents and is reachable before the charging or discharging period when the vehicle is predicted to, before a start of the charging or discharging period, be unable to execute the contract contents in the set electric vehicle supply equipment.

12. A server comprising:
a communication interface configured to communicate with a vehicle; and
a processor, wherein:
the vehicle includes a power device in which charging or discharging is executed by a charging or discharging lane configured to execute at least one of the charging or the discharging of the vehicle in a non-contact manner, and is configured to
acquire contract contents including a charging or discharging amount that defines at least one of a charging amount or a discharging amount, and a charging or discharging period that defines at least one of a charging period or a discharging period, and
execute the contract contents in a charging or discharging lane that is different from electric vehicle supply equipment set in the contract contents and is reachable before the charging or discharging period when the vehicle is predicted to, before a start of the charging or discharging period, be unable to execute the contract contents in the set electric vehicle supply equipment; and
the processor is configured to, when the vehicle executes the contract contents in the charging or discharging lane, receive execution completion information indicating that the contract contents have been executed.

* * * * *